United States Patent
Walgenbach (10) Patent No.: US 9,595,816 B2
(45) Date of Patent: Mar. 14, 2017

(54) SAFE USE PANELBOARD KEYED SHUTTER SYSTEM

(71) Applicant: SCHNEIDER ELECTRIC USA, INC., Palatine, IL (US)

(72) Inventor: Jacob E. Walgenbach, Nashville, TN (US)

(73) Assignee: Schneider Electric USA, Inc., Andover, MA (US)

( * ) Notice: Subject to any disclaimer, the term of this patent is extended or adjusted under 35 U.S.C. 154(b) by 156 days.

(21) Appl. No.: 14/582,139

(22) Filed: Dec. 23, 2014

(65) Prior Publication Data

US 2016/0181769 A1   Jun. 23, 2016

(51) Int. Cl.
| | |
|---|---|
| *H01R 13/453* | (2006.01) |
| *H02B 1/14* | (2006.01) |
| *H02B 1/06* | (2006.01) |
| *H02B 1/04* | (2006.01) |
| *H01H 71/08* | (2006.01) |
| *H02B 11/24* | (2006.01) |
| *H02B 1/056* | (2006.01) |

(52) U.S. Cl.
CPC ............... *H02B 1/14* (2013.01); *H01H 71/08* (2013.01); *H02B 1/04* (2013.01); *H02B 1/06* (2013.01); *H02B 11/24* (2013.01); *H02B 1/056* (2013.01)

(58) Field of Classification Search
CPC . H02B 1/04; H02B 1/14; H02B 11/24; H02B 1/06; H01H 71/08
USPC ............... 439/136, 137, 143, 145; 200/50.22
See application file for complete search history.

(56) References Cited

U.S. PATENT DOCUMENTS 3,463,967 A  *  8/1969  Klein ..................... H02B 1/056
                                                  200/293
4,722,693 A  *  2/1988  Rose .................. H01R 13/4534
                                                  439/137
(Continued)

FOREIGN PATENT DOCUMENTS

| EP | 2493038 | 8/2012 |
| WO | 2014209317 | 12/2014 |
| WO | 2015047371 | 4/2015 |

OTHER PUBLICATIONS

EP Extended Search Report for Application No. 15201822.2 dated May 12, 2016.

*Primary Examiner* — Abdullah Riyami
*Assistant Examiner* — Nelson R Burgos-Guntin
(74) *Attorney, Agent, or Firm* — Locke Lord LLP (57) ABSTRACT

Methods and systems for reducing exposure to live parts in a panelboard allow a circuit breaker or other branch electrical device to be safely installed and removed from the panelboard. The methods and systems provide a shutter system that operates in conjunction with the circuit breaker or other branch electrical device to automatically restrict access to the conductors in the panelboard until the circuit breaker is inserted in the panelboard. Specifically, the circuit breaker has one or more insertion keys on its casing that align with and fit into one or more keyed openings in the shutter system. When the circuit breaker is inserted into the panelboard, the insertion keys automatically force open the shutter system to allow the circuit breaker terminals to contact the conductors. Removing the circuit breaker from the panelboard automatically closes the shutter system and prevents fingers or tools from inadvertently accessing the conductors.

12 Claims, 5 Drawing Sheets

(56) References Cited

U.S. PATENT DOCUMENTS

| | | | | |
|---|---|---|---|---|
| 4,743,204 A * | 5/1988 | Fromm | H01H 73/08 | 439/265 |
| 4,905,122 A * | 2/1990 | Culnan | H02B 1/056 | 361/634 |
| 5,695,350 A * | 12/1997 | Mei | H01R 13/4532 | 439/139 |
| 7,011,551 B2 | 3/2006 | Johansen et al. | | |
| 7,312,394 B1 * | 12/2007 | Weeks | H01R 13/4534 | 174/53 |
| 7,527,508 B1 * | 5/2009 | Lee | H01R 13/4534 | 439/137 |
| 8,100,705 B2 * | 1/2012 | Chen | H01R 13/4534 | 439/137 |
| 8,465,305 B2 * | 6/2013 | Wilkie | H02B 11/24 | 439/137 |
| 8,568,152 B1 * | 10/2013 | Weeks | H05K 5/02 | 439/137 |
| 9,025,320 B2 * | 5/2015 | Neukam | G06F 1/181 | 361/679.02 |
| 9,312,666 B1 * | 4/2016 | Walgenbach | H01H 73/08 | |
| 2003/0148645 A1 * | 8/2003 | Hashimoto | H01R 13/4532 | 439/137 |
| 2004/0092145 A1 * | 5/2004 | Sasame | H01R 13/6485 | 439/137 |
| 2005/0026481 A1 * | 2/2005 | Nishio | H01R 23/70 | 439/137 |
| 2009/0052120 A1 * | 2/2009 | Weeks | H01R 13/641 | 361/601 |
| 2009/0311892 A1 * | 12/2009 | Weeks | H01R 13/4534 | 439/137 |
| 2015/0064949 A1 | 3/2015 | Rahn et al. | | |
| 2016/0181768 A1 * | 6/2016 | Sharp | H02B 1/14 | 361/631 |
| 2016/0181769 A1 * | 6/2016 | Walgenbach | H02B 1/14 | 248/345 |

* cited by examiner

FIG. 6

SAFE USE PANELBOARD KEYED SHUTTER SYSTEM

FIELD OF THE INVENTION

The present disclosure relates to methods and systems for installing and removing a circuit breaker from an electrical panel or panelboard, and more particularly to a method and system for reducing the chances of exposure to live parts in the panelboard.

BACKGROUND OF THE INVENTION

An electrical panel or panelboard has a main bus and individual connection points on the bus that are connectable to electrical devices, such as circuit breakers for branch conductors and any other electrical devices designed to be installed for a branch circuit. Because the circuit breakers and other branch electrical devices are typically mounted directly to the panelboard, an operator and/or tools may come in contact with exposed conductors in the panelboard when installing or removing the circuit breakers from the panelboard. Thus, it is recommended that power be shut off to the panelboard as a precaution when electrical devices are being installed or removed. However, it may be considered desirable in some cases to keep the panelboard energized to prevent an electrical hazard as a consequence of deenergization, or operators may intentionally keep the power on in the interest of saving time. Moreover, shutting off power to the panelboard can be a major inconvenience, especially for data centers, hospitals, and other critical applications that require a high availability power source.

Thus, a need exists for an improved way to safely install and remove a circuit breaker or other branch electrical devices from an electrical panel as part of a larger scheme for installing and removing branch circuit devices without deenergizing the electrical panel.

SUMMARY OF THE DISCLOSED EMBODIMENTS

The embodiments disclosed herein are directed to methods and systems for reducing exposure to live parts in a panelboard and safety installing and removing a circuit breaker or other branch electrical devices from the panelboard. The disclosed embodiments provide a shutter system that is attachable to the panelboard in a circuit breaker mounting slot of the panelboard. The shutter system provides a protective interface for the panelboard that automatically restricts access to the conductors in the panelboard until a circuit breaker or other branch electrical device is inserted in the panelboard. Inserting the circuit breaker or other branch electrical device in the panelboard opens the shutter system and allows the device to access the conductors in the panelboard. The circuit breaker or other branch electrical device uses one or more insertion keys protruding from beneath an outer casing of the breaker or other device that align with and fit into one or more keyed openings in the shutter system. When the electrical device is inserted into the panelboard, the insertion keys automatically force open the shutter system to allow the device's terminals to contact the conductors. The terminals are preferably male terminals, but female terminals are certainly within the scope of the disclosed embodiments. Removing the circuit breaker or other electrical device from the panelboard automatically closes the shutter system and prevents fingers or tools and the like from inadvertently accessing the conductors. Such a shutter system minimizes the potential for exposure to live parts in the panelboard.

In some implementations, the shutter system may include a housing having a size and shape that allows the system to fit within a device slot in the panelboard. The housing has a support base at each end and side braces connecting the sides of the support bases to define a rectangular shaped frame. A shutter composed of two planar shutter plates is disposed lengthwise in the housing. The shutter plates are positioned on opposite sides of the housing so they oppose one another. Each shutter plate has a drive block attached to or integrally formed on each end that may be manipulated to move the shutter plate. The drive blocks are slidably mounted on the support bases, a pair of drive blocks per support base, one from each shield plate, for a total of four drive blocks. Bringing the drive blocks of the two shutter plates together brings the shutter plates themselves together. Each shutter plate is composed of several sections, including a midsection flanked by two shield sections on either side. The midsection is substantially in line with the shutter plate while the shield sections are offset toward the middle of the housing. The offset causes the shield sections of one shutter plate to overlap the shield sections of the other shutter plate in the middle area of the housing. Being in this middle area places the shield sections directly over the conductors in the panelboard, thus covering and blocking access to the conductors and placing shutter in a closed position. When the two shutter plates are brought together, the offset causes the shield sections to move to the sides of the housing, thus uncovering and unblocking access to the conductors and placing the shutter in an open position.

In some implementations, each drive block may have, or may be, a sloped or slanted surface that angles up and inward toward the other drive block on a support base. A spring or other biasing mechanism may be disposed between the drive blocks on the support base to bias the drive blocks apart. The distance between the drive blocks, as dictated by the width of the housing, is about the same as the distance between the insertion keys of the circuit breaker or other branch electrical device so inserting the device in the panelboard pushes the insertion keys down against the drive blocks. The downward push of the insertion keys against the sloped surfaces of the drive blocks brings the drive blocks together, which brings the shutter plates together. This causes the shield sections to move apart and uncover the conductors in the panelboard, allowing the terminals of the electrical device to access the conductors. Keyed openings shaped to match the insertion keys of the electrical device are provided in the support bases. The keyed openings ensure the insertion keys, and hence the electrical device, are correctly inserted in the panelboard. These keyed openings may be covered up initially by the drive blocks, but are gradually revealed as the insertion keys of the electrical device push against the drive blocks.

In general operation, the motion of inserting the circuit breaker or other branch electrical device, which is preferably in the off position, into the panelboard causes the insertion keys on the device to contact the sloped surfaces of the drive blocks. As the electrical device continues its motion into the panelboard, the insertion keys push against the slope surfaces of the drive blocks, driving the drive blocks toward each other. As the drive blocks move toward one another, they uncover the keyed openings in the support bases, allowing the insertion keys in the electrical device to slip into the openings. The movement of the drive blocks toward one another also moves the shutter plates together. As the shutter plates come together, the shield section separate and uncover the conductors in the panelboard to allow the terminals of the electrical device to access the conductors.

In some implementations, the insertion keys of the electrical device may be in the form of legs protruding from underneath the breaker casing. The legs are not conductive so they cannot inadvertently carry current. Similarly, the keyed openings in the support bases do not lead to any conductors in the panelboard. These keyed openings may all have the same size and shape, or different size and shape keyed openings may be used with different key configurations to ensure correct orientation of the electrical device. A single keyed opening and a single key may also be used to ensure correct orientation of the device.

In some implementations, a guide slit may be formed in one of the drive blocks on a support base and a corresponding guide arm may be provided in the other drive block on the support base to control the movement of the drive blocks toward each other. Alternatively, both a guide slit and a guide arm may be provided on each drive block such that the guide slit and guide arm in one drive block are aligned with the guide arm and guide slit in the other drive block. In some implementations, the shutter system may have four keyed openings and four insertion keys on the circuit breaker or other branch electrical device, although two insertion keys may be sufficient to operate the shutter system.

In some implementations, a panel cover may be disposed over the shutter system. The panel cover provides an additional safety measure to prevent tampering with the shutter system when no circuit breaker or other branch electrical device is mounted in the shutter system. Openings may be formed in the panel cover corresponding to the locations of the keyed openings in the support bases and the terminals on the electrical device. These openings may be shaped to match the insertion keys on the electrical device, or they may simply be larger than the insertion keys.

In general, in one aspect, the disclosed embodiments are directed to a shutter system for an electrical panelboard. The shutter system comprises, among other things, a housing for mounting in a breaker slot of the panelboard, the housing having support bases at opposite ends thereof, the support bases connected together by side braces to form a substantially rectangular shape for the housing. The shutter system also comprises a shutter having planar shutter plates disposed lengthwise in the housing, the shutter plates positioned on opposite sides of the housing, each shutter plate having one or more shield sections offset toward a middle of the housing such that the shield sections of one shutter plate overlap the shield sections of the other shutter plate, the overlapping shield sections positioned to block access to conductors in the panelboard. The shutter system further comprises a drive block provided on at least one end of each shutter plate, each drive block slidably mounted on one of the support bases, the drive block of one shutter plate being slidable toward the drive block of the other shutter plate to bring the shutter plates together. Bringing the shutter plates together causes the shield sections of the shutter plates to move apart and into positions to unblock access to conductors in the panelboard.

BRIEF DESCRIPTION OF THE DRAWINGS

The foregoing and other advantages of the disclosed embodiments will become apparent upon reading the following detailed description and upon reference to the drawings, wherein.

DETAILED DESCRIPTION OF THE DISCLOSED EMBODIMENTS

As an initial matter, it will be appreciated that the development of an actual, real commercial application incorporating aspects of the disclosed embodiments will require many implementation specific decisions to achieve the developer's ultimate goal for the commercial embodiment. Such implementation specific decisions may include, and likely are not limited to, compliance with system related, business related, government related and other constraints, which may vary by specific implementation, location and from time to time. While a developer's efforts might be complex and time consuming in an absolute sense, such efforts would nevertheless be a routine undertaking for those of skill in this art having the benefit of this disclosure.

It should also be understood that the embodiments disclosed and taught herein are susceptible to numerous and various modifications and alternative forms. Thus, the use of a singular term, such as, but not limited to, "a" and the like, is not intended as limiting of the number of items. Similarly, any relational terms, such as, but not limited to, "top," "bottom," "left," "right," "upper," "lower," "down," "up," "side," and the like, used in the written description are for clarity in specific reference to the drawings and are not intended to limit the scope of the invention.

Figure 1:
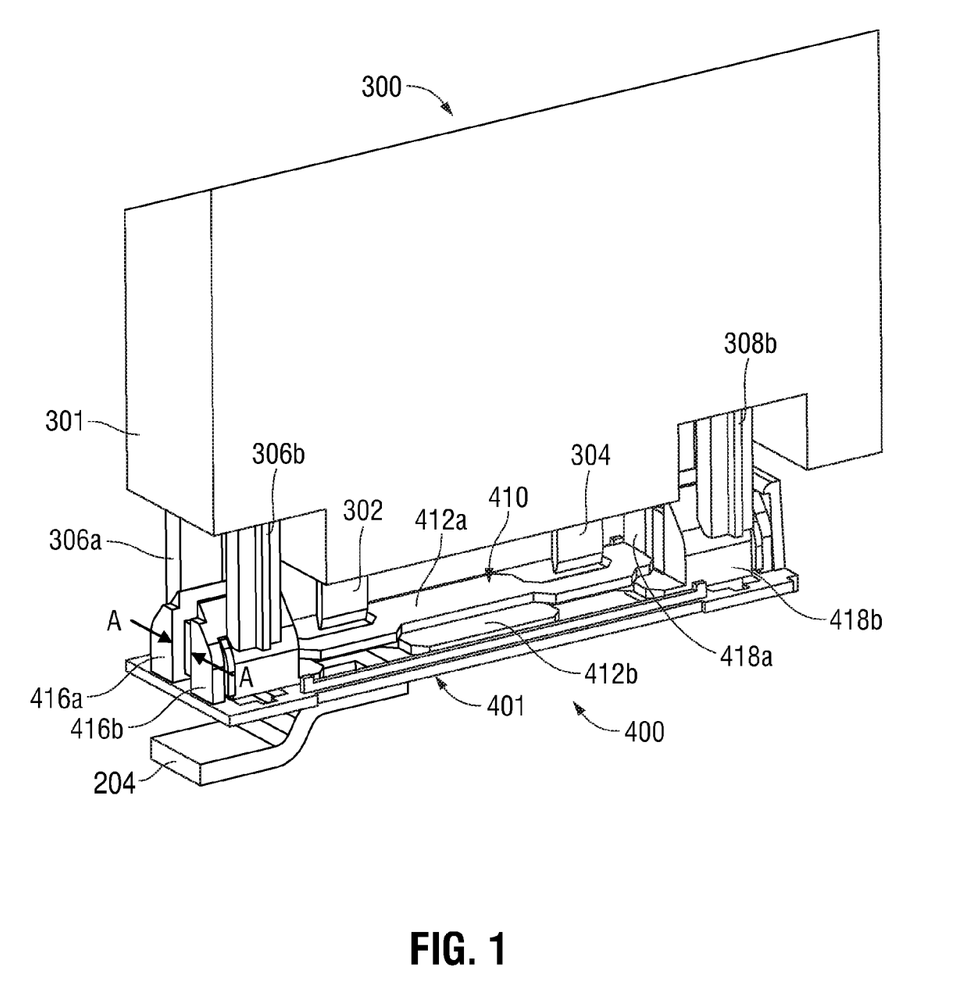
FIG. 1 is an exemplary shutter system according to one or more embodiments disclosed herein.
Figure 2:
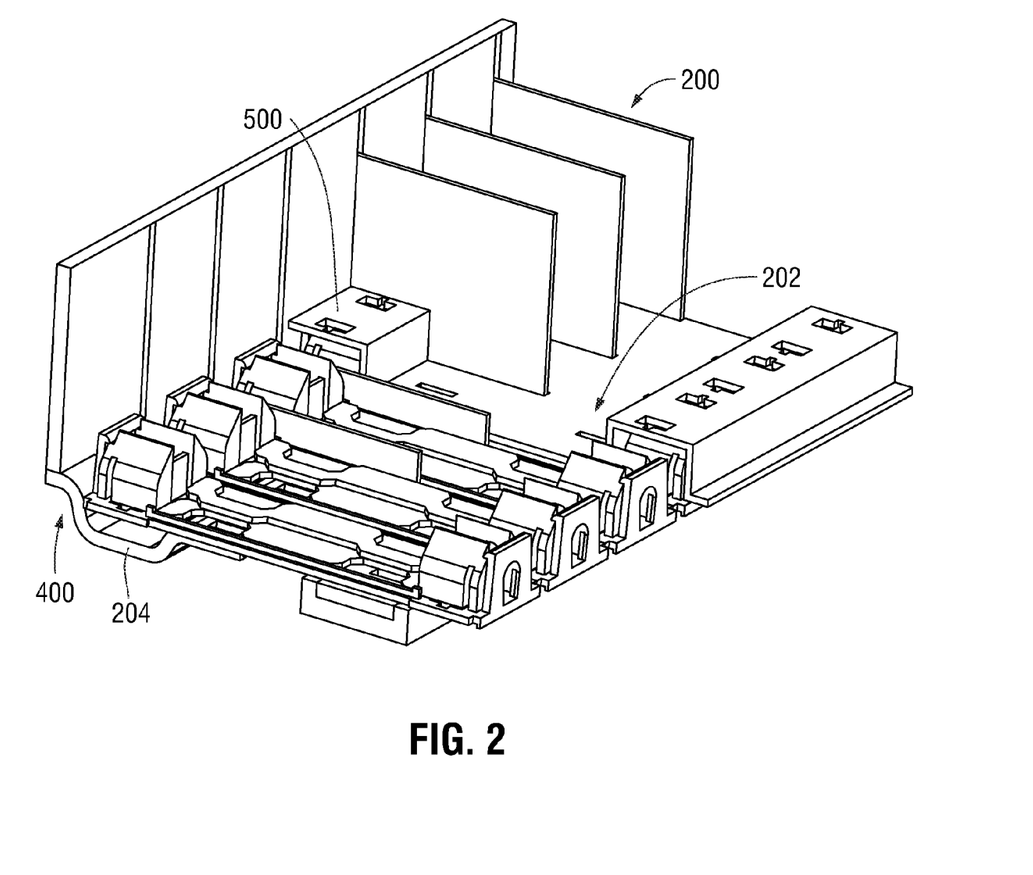
FIG. 2 is an exemplary panelboard on which an exemplary shutter system may be mounted according to one or more embodiments disclosed herein.

Referring now to FIGS. 1 and 2, a shutter system 400 is shown that may be used to install and remove a circuit breaker 300 or other branch electrical device from a panelboard 200. For clarity and economy, the disclosed embodiments are described mainly with respect to the circuit breaker 300; however, it will be understood the inventive principles and concepts discussed herein may apply equally to any branch electrical device. In any case, the shutter system 400 is attachable to the panelboard 200 and provides a protective interface between the panelboard 200 and the circuit breaker 300. Inserting the circuit breaker 300 in the shutter system 400 automatically opens the shutter system 400 to the circuit breaker 300, allowing the circuit breaker 300 to access to the conductors 204 in the panelboard 200. Such a shutter system 400 reduces the chance of exposure to live parts in the panelboard 200 and also allows operators to safely insert and remove the circuit breaker 300 and other electrical device from the panelboard 200.

As can be seen in FIG. 1, the circuit breaker 300 has an outer casing 301 from which several terminals 302, 304 and insertion keys 306a & 306b and 308a & 308b may extend from underneath the casing 301. The insertion keys 306a & 306b and 308a & 308b engage and open the shutter system 400 when the circuit breaker 300 is inserted in the shutter system 400. In particular, the shutter system 400 includes a housing 401 having a shutter 410 disposed lengthwise therein composed of two planar shutter plates 412a and 412b. The shutter plates 412a, 412b are positioned on opposite sides of the housing 401 so they oppose one another. Each shutter plate 412a, 412b has a drive block 416a & 418a and 416b & 418b attached to or integrally formed on each end thereof that may be manipulated to move the shutter plate 412a, 412b. When the circuit breaker 300 is inserted into the shutter system 400, the insertion keys 306a & 306b and 308a & 308b engage and force the drive blocks 416a & 418a and 416b & 418b of the two shutter plates 412a, 412b together, as indicated by the arrows labeled "A." This brings the shutter plates 412a, 412b themselves together, which opens the shutter 410 and allows access to the conductors 204 in the panelboard 200, as described more fully herein.

FIG. 2 shows a panelboard 200 that may be used with the shutter system 400 according to one or more embodiments disclosed herein. The panelboard 200 resembles many typical panelboards insofar as there are several circuit breaker 300 slots, one of which is indicated at 202, to which the circuit breaker 300 may be mounted for connecting to conductors 204, one of which can be seen at 204, in the panelboard 200. However, instead of being mounted directly to the panelboard 200, the circuit breakers 300 are mounted to the shutter system 400 attached in the breaker slots of the panelboard 200. The shutter system 400 blocks external access to the conductors 204 in the panelboard 200 unless and until the circuit breaker 300 is inserted. Insertion of the circuit breaker 300 in the shutter system 400 opens the shutter system 400 and allows the circuit breaker terminals 302, 304 to contact the conductors 204 in the panelboard 200. Removing the circuit breaker 300 returns the shutter system 400 to the closed position to again block access to the conductors 204. And of course, the circuit breaker 300 itself blocks any external access to the conductors 204 when inserted in the panelboard 200.

Figure 3:
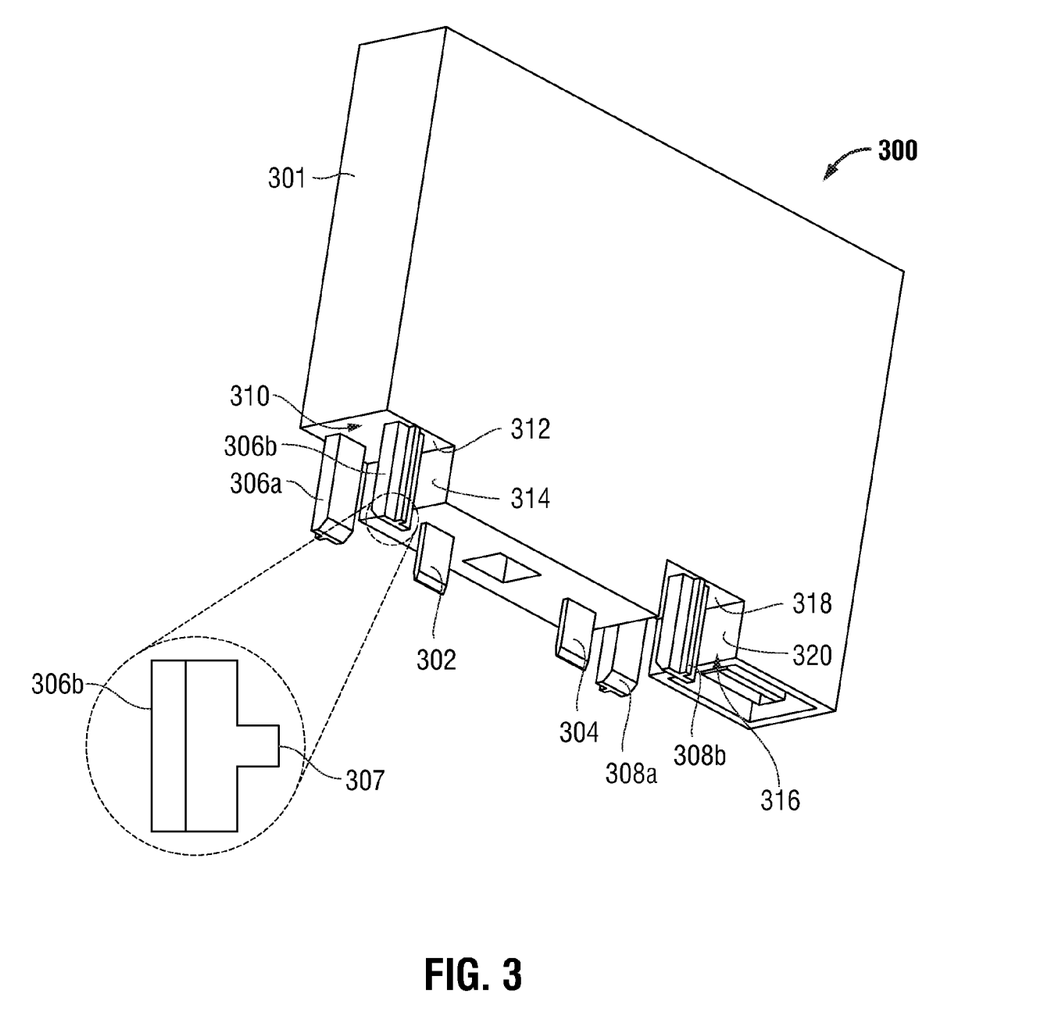
FIG. 3 is an exemplary circuit breaker for an exemplary shutter system according to one or more embodiments disclosed herein.

FIG. 3 illustrates an example of the circuit breaker 300 that may be inserted in the shutter system 400 according to the embodiments disclosed herein. As can be seen, the circuit breaker 300 has an outer casing 301 from which several terminals 302, 304 may extend from underneath the casing 301. The terminals 302, 304 provide contact with the conductors 204 in the panelboard 200 and typically include a load terminal 302, a neutral terminal 304, as well as a line terminal that is not expressly labeled. The load and neutral terminals 302, 304 shown here are male terminals that resemble stabs, but female terminals (e.g., plug-on terminals) are certainly within the scope of the disclosed embodiments. One or more insertion keys 306a & 306b and 308a & 308b also extend from underneath the outer casing 301. In the example shown here, there are two front insertion keys 306a & 306b near the front of the circuit breaker 300 and two rear insertion keys 308a & 308b near the rear of the circuit breaker 300. The insertion keys 306a & 306b and 308a & 308b resemble legs and are not conductive so they cannot inadvertently carry current. Fewer or more keys may certainly be used, for example, only the front insertion keys 306a & 306b or only the rear insertion keys 308a & 308b, without departing from the scope of the disclosed embodiments. One or more of these insertion keys 306a & 306b and 308a & 308b may have a specific shape or feature, for example, a ridge 307, that ensures correct insertion of the keys only into keyed openings 408 that have a matching shape or feature.

The front insertion keys 306a & 306b protrude from a pocket 310 under the casing 301 defined by walls 312 and 314 near the front of the circuit breaker 300, and the rear insertion keys 308a & 308b protrude from a pocket 316 under the casing 301 defined by walls 318, 320, and 322 near the rear of the circuit breaker 300. The front pocket 310 and rear pocket 316 provide room in which to receive the aforementioned drive blocks 416a & 418a and 416b & 418b of the shutter system 400, as described with respect to FIGS. 4A and 4B.

Figure 4A:
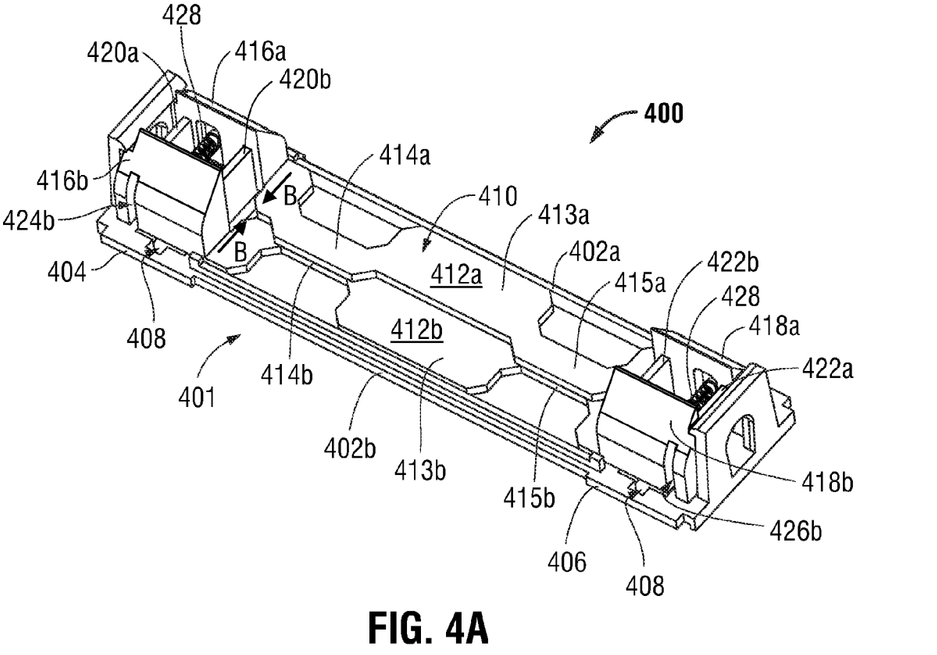
FIGS. 4A and 4B are an exemplary shutter system according to one or more embodiments disclosed herein.

Referring to FIG. 4A, the shutter system 400 according to some embodiments includes an elongated housing 401 having two side braces 402a and 402b connected together at their ends by support bases 404 and 406 to form a rectangular frame. The shutter 410 mentioned earlier and the two shutter plates 412a, 412b making up the shutter 410 may also be seen here, with the two shutter plates 412a, 412b positioned on opposite sides of the housing 401 so they oppose one another. The drive blocks 416a & 418a and 416b & 418b are attached to or integrally formed on the ends of these shutter plates 412a, 412b. In this example, the first shutter plate 412a has the drive blocks 416a & 418a provided on the ends thereof, and the second shutter plate 412b has the drive blocks 416b & 418b provided on the ends thereof. The drive blocks 416a & 418a and 416b & 418b are slidably disposed on and supported by the support bases 404, 406, with the drive blocks of opposing shutter plates residing on the same support base. Bringing these drive blocks 416a & 418a and 416b & 418b together, as indicated by the arrows labeled "B," brings the shutter plates 412a, 412b together.

Figure 4B:
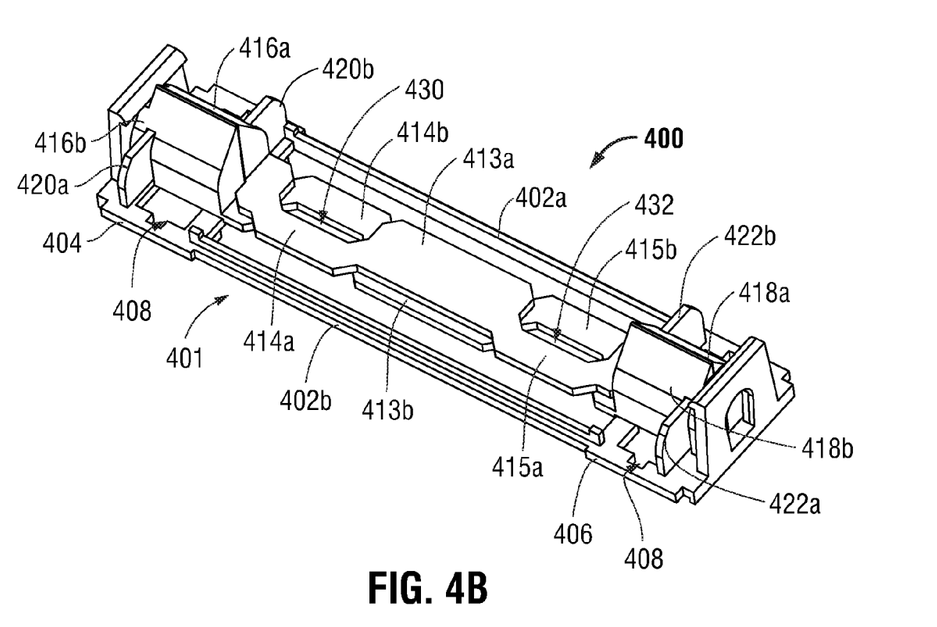

In FIG. 4A, each shutter plate 412a, 412b is composed of several sections, including a midsection 413a and 413b flanked on either side by two shield sections 414a & 415a and 414b & 415b. On each shutter plate, the midsection 413a, 413b is substantially in line with the shutter plate while the shield sections 414a & 415a and 414b & 415b are offset toward the middle of the housing 401. The offset causes the shield sections 414a & 415a of one shutter plate 412a to overlap the shield sections 414b & 415b of the other shutter plate 412b near the middle area between the two side braces 402a, 402b of the housing 401. When the shield sections 414a & 415a and 414b & 415b are in the middle area, they sit directly over the conductors 204 in the panelboard 200 (FIG. 2), thus covering and blocking access to the conductors 204. When the shield sections 414a & 415a and 414b & 415b thus occupy the middle area of the housing 401, the shutter 410 is considered to be in the closed position. When the two shutter plates 412a, 412b are brought together, the shield sections 414a & 415a and 414b & 415b move to the sides of the housing 401, as shown in FIG. 4B, thus uncovering and unblocking access to the conductors 204. The shutter 410 is now considered to be in the open position.

Note in the foregoing embodiments that both shutter plates 412a, 412b are moved to the sides of the housing 401. In the event only one of the shutter plates is moved, the shutter plate 412a for example, then the shield sections 414b & 415b of the other shutter plate 412b would remain in the middle area of the housing 401 and continue to block access to the conductors 204.

Referring to FIG. 4B, moving the two shutter plates 412a, 412b together entails moving the drive blocks 416a & 418a and 416b & 418b of the shutter plates together. To this end, each drive block 416a & 418a and 416b & 418b may have, or may be, a sloped or slanted surface that angles up and inward toward the other drive block on the same support base 404, 406. A spring 428 or other biasing mechanism may be disposed between adjacent drive blocks 416a & 416b and 418a & 418b on each support base 404, 406 to keep the drive blocks spaced apart. The distance between the drive blocks 416a & 416b and 418a & 418b on a support base 404, 406 is limited by the width of the housing to be about the same as the distance between the insertion keys 306a & 306b and 308a & 308b of the circuit breaker 300. As a result, when the circuit breaker 300 is inserted in the shutter system 400, the insertion keys 306a & 306b and 308a & 308b contact the drive blocks 416a & 416b and 418a & 418b. As the circuit breaker 300 is inserted, the insertion keys 306a & 306b and 308a & 308b push down against the sloped surfaces of the drive blocks 416a & 416b and 418a & 418b, which moves the drive blocks together. The drive blocks coming together moves the shutter plates 412a, 412b together, causing the shield sections 414a & 415a and 414b & 415b to slide apart and create access openings 430 and 432 therebetween through which the conductors 204 in the panelboard 200 may be accessed.

In some embodiments, each support base 404, 406 may have a pair of keyed openings 408, one on each side of the support base, for receiving the insertion keys 306a & 306b and 308a & 308b of the circuit breaker 300. The keyed openings 408 are mostly concealed by the drive blocks 416a & 416b and 418a & 418b in FIG. 4A, but are revealed when the drive blocks 416a & 416b and 418a & 418b are moved together in FIG. 4B. These keyed openings 408 have a shape or shapes that match the shape or shapes of the insertion keys 306a & 306b and 308a & 308b of the circuit breaker 300. The matching shapes ensure that the correct insertion keys, and hence correct circuit breaker 300, are being inserted and that the circuit breaker 300 is properly oriented for insertion.

In some embodiments, each drive block 416a & 416b and 418a & 418b may have a guide arm provided thereon, indicated at 420a & 422a and 420b & 422b, and a guide slit provided therein, two of which may be seen at 424b and 426b. The guide arm of a drive block on a support base 404, 406 are located opposite to the guide slit of the other drive block on the support base, and vice versa. These guide arms and guide slits help guide or control the movement of the drive blocks 416a & 416b and 418a & 418b toward each other when the circuit breaker 300 is inserted in the shutter system 400. In alternative embodiments, rather than each drive block 416a & 416b and 418a & 418b having both a guide arm and a guide slit, one of the drive blocks 416a & 416b and 418a & 418b on the support base 404, 406 may have a guide arm while the other drive block on the support base may have a guide slit.

In general operation, the circuit breaker 300 is preferably put in the off position, then inserted in the shutter system 400 mounted on the panelboard 200. The insertion of the circuit breaker 300 causes the insertion keys 306a & 306b and 308a & 308b under the circuit breaker casing 301 to contact the sloped surfaces of the drive blocks 416a & 416b and 418a & 418b. As the circuit breaker 300 continues its motion into the shutter system 400, the insertion keys 306a & 306b and 308a & 308b push against the slope surfaces of the drive blocks 416a & 416b and 418a & 418b, driving the drive blocks toward each other. As the drive blocks move toward one another, they uncover the keyed openings 408 in the support bases 404, 406, allowing the insertion keys 306a & 306b and 308a & 308b in the circuit breaker 300 to slip into these openings. The movement of the drive blocks 416a & 416b and 418a & 418b toward one another also moves the shutter plates 412a, 412b together. As the shutter plates 412a, 412b come together, the shield sections 414a & 415a and 414b & 415b move apart to uncover and unblock the conductors 204 in the panelboard 200.

Figure 5:
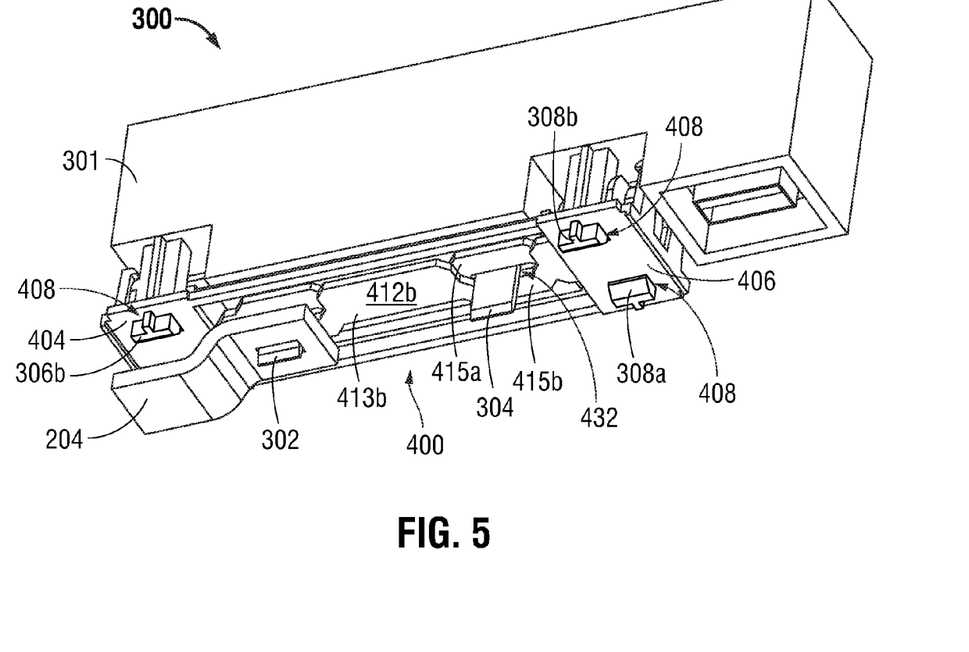
FIG. 5 is a close-up view of a circuit breaker mounted on a shutter system according to one or more embodiments disclosed herein.

FIG. 5 shows a close-up view from underneath the shutter system 400 with the circuit breaker 300 inserted therein. From this vantage point, the insertion keys 306a & 306b and 308a & 308b of the circuit breaker 300 may be seen protruding through the keyed openings 408 in the support bases 404, 406, bringing the drive blocks 416a & 416b and 418a & 418b together in the process. As a result, the shield sections 414a & 415a and 414b & 415b have moved apart, leaving the access openings 430, 432 (only 432 visible here) through which the load and neutral terminals 302, 304 of the circuit breaker 300 may extend to access the conductors 204.

Figure 6:
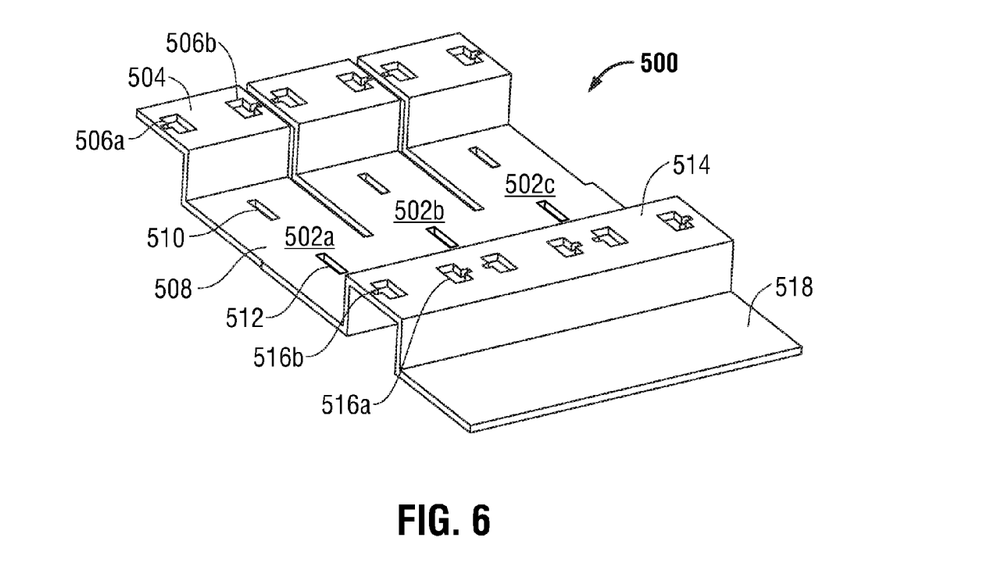
FIG. 6 is an exemplary panel cover according to one or more embodiments disclosed herein.

In some embodiments, a panel cover 500 may be disposed over the shutter system 400, an example of which is depicted in FIG. 6. The panel cover 500, which can be seen mounted on the panelboard 200 in FIG. 2, provides an additional safety measure against tampering with the shutter system 400, particularly when no circuit breaker 300 is mounted in the shutter system 400. In the example of FIG. 6, the panel cover 500 has three individual panel segments 502a, 502b, and 502c, each panel segment intended to cover one shutter system 400 in one breaker slot 202. This particular panel cover 500 is specifically suited for a 3-pole circuit breaker 300, but it is of course possible to have a panel cover 500 with fewer or more than three panel segments without departing from the scope of the disclosed embodiments. The individual panel segments 502a-c are nearly identical to each other and are therefore described together for economy purposes. As can be seen, each panel segment 502a-c includes an elevated front section 504 designed to accommodate the drive blocks 416a & 416b of the shutter system 400. The front section 504 has holes 506a and 506b formed therein of sufficient size to receive the front insertion keys 306a & 306b of the circuit breaker 300. Each panel segment 502a-c also includes a terminal section 508 stepped down from the front section 504 with holes 510 and 512 formed therein of sufficient size to receive the load and neutral terminals 302, 304, respectively of the circuit breaker 300. The terminal section 508 steps up to an elevated rear section 514 designed to accommodate the drive blocks 418a & 418b of the shutter system 400. The rear section 514 has holes 516a and 516b formed therein of sufficient size to receive the rear insertion keys 308a & 308b of the circuit breaker 300. A stepped-down panel extension 518 is also provided for engaging a separate cover structure (not expressly shown) for the panelboard. Note in the foregoing that the holes 506a, 506b in the front section 504 and the holes 516a, 516b in the rear section 514 may be shaped to match the insertion keys 306a & 306b and 308a & 308b, or they may simply be larger than the keys.

While particular aspects, implementations, and applications of the present disclosure have been illustrated and described, it is to be understood that the present disclosure is not limited to the precise construction and compositions disclosed herein and that various modifications, changes, and variations may be apparent from the foregoing descriptions without departing from the spirit and scope of the disclosed embodiments as defined in the appended claims.

What is claimed is:

1. A shutter system for an electrical panelboard, comprising:

a housing for mounting in a breaker slot of the panelboard, the housing having support bases at opposite ends thereof, the support bases connected together by side braces to form a substantially rectangular shape for the housing;

a shutter having planar shutter plates disposed lengthwise in the housing, the shutter plates positioned on opposite sides of the housing, each shutter plate having one or more shield sections offset toward a middle of the housing such that the shield sections of one shutter plate overlap the shield sections of the other shutter plate, the overlapping shield sections positioned to block access to conductors in the panelboard; and a drive block provided on at least one end of each shutter plate, each drive block slidably mounted on one of the support bases, the drive block of one shutter plate being slidable toward the drive block of the other shutter plate to bring the shutter plates together;

wherein bringing the shutter plates together causes the shield sections of the shutter plates to move apart and into positions to unblock access to conductors in the panelboard.

2. The shutter system of claim 1, further comprising a biasing mechanism configured to bias the drive blocks apart from one another.

3. The shutter system of claim 1, further comprising a circuit breaker mountable in the shutter system, wherein mounting the circuit breaker in the shutter system brings the shutter plates together, causing the shield sections of the shutter plates to move apart and unblock access to conductors in the panelboard.

4. The shutter system of claim 3, wherein removing the circuit breaker from the shutter system returns the shutter plates to the opposite sides of the housing, causing the shield sections of the shutter plates to come together and block access to conductors in the panelboard.

5. The shutter system of claim 3, further comprising keys protruding from underneath an outer casing of the circuit breaker and positioned to contact the drive blocks of the shutter plates when the circuit breaker is mounted in the shutter system, the keys forcing the drive blocks to slide together when the circuit breaker is mounted in the shutter system.

6. The shutter system of claim 5, wherein the drive blocks include sloped surfaces and the keys force the drive blocks to slide together by contacting the sloped surfaces when the circuit breaker is mounted in the shutter system.

7. The shutter system of claim 5, further comprising keyed openings formed in the support bases of the housing, the keyed openings positioned on the support bases to receive the keys of the circuit breaker when the circuit breaker is mounted in the shutter system.

8. The shutter system of claim 7, wherein the keyed opening in the support bases have a shape that matches the keys of the circuit breaker.

9. The shutter system of claim 7, wherein the keyed openings in the support bases are at least partially covered by the drive blocks of the shutter plates and mounting the circuit breaker in the shutter system causes the drive blocks to uncover the keyed openings.

10. The shutter system of claim 3, further comprising one or more terminals protruding from underneath an outer casing of the circuit breaker, wherein the shield sections of the shutter plates move to opposite sides of the housing when the circuit breaker is mounted in the shutter system and the terminals of the circuit breaker pass between the shield sections on the opposite sides of the housing to access the panelboard.

11. The shutter system of claim 1, further comprising a guide slit provided in one of the drive blocks and a guide arm provided on another one of the drive blocks, the guide slit receiving the guide arm therein when the drive blocks are brought together.

12. The shutter system of claim 3, further comprising a panel cover disposed over the shutter system, the panel cover preventing tampering with the shutter system.

* * * * *